April 26, 1966
G. F. GIELOW
3,247,953
VEHICLE SEAT ASH RECEIVER
Filed Sept. 3, 1964
2 Sheets-Sheet 1
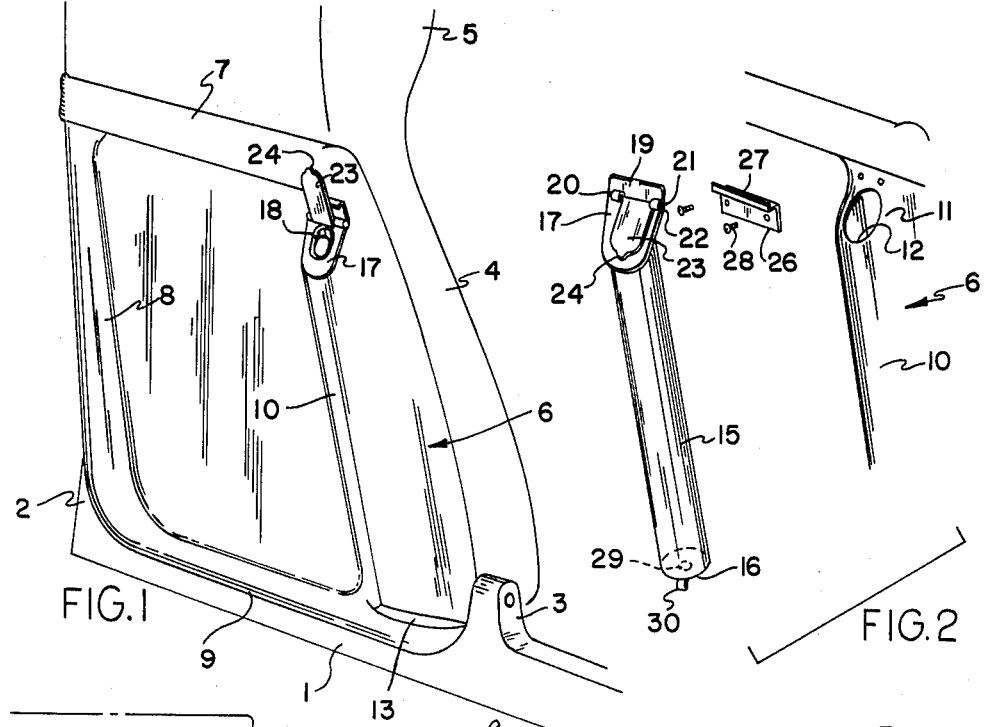
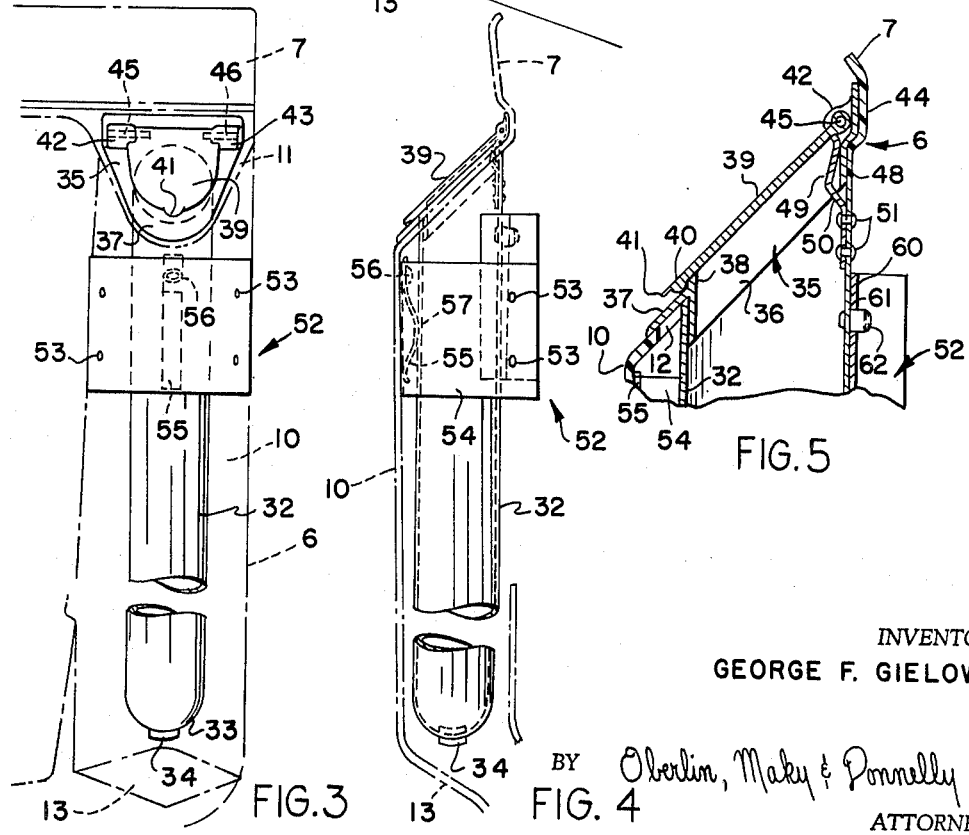
INVENTOR
GEORGE F. GIELOW
BY Oberlin, Maky & Donnelly
ATTORNEYS April 26, 1966  G. F. GIELOW  3,247,953
VEHICLE SEAT ASH RECEIVER
Filed Sept. 3, 1964  2 Sheets-Sheet 2
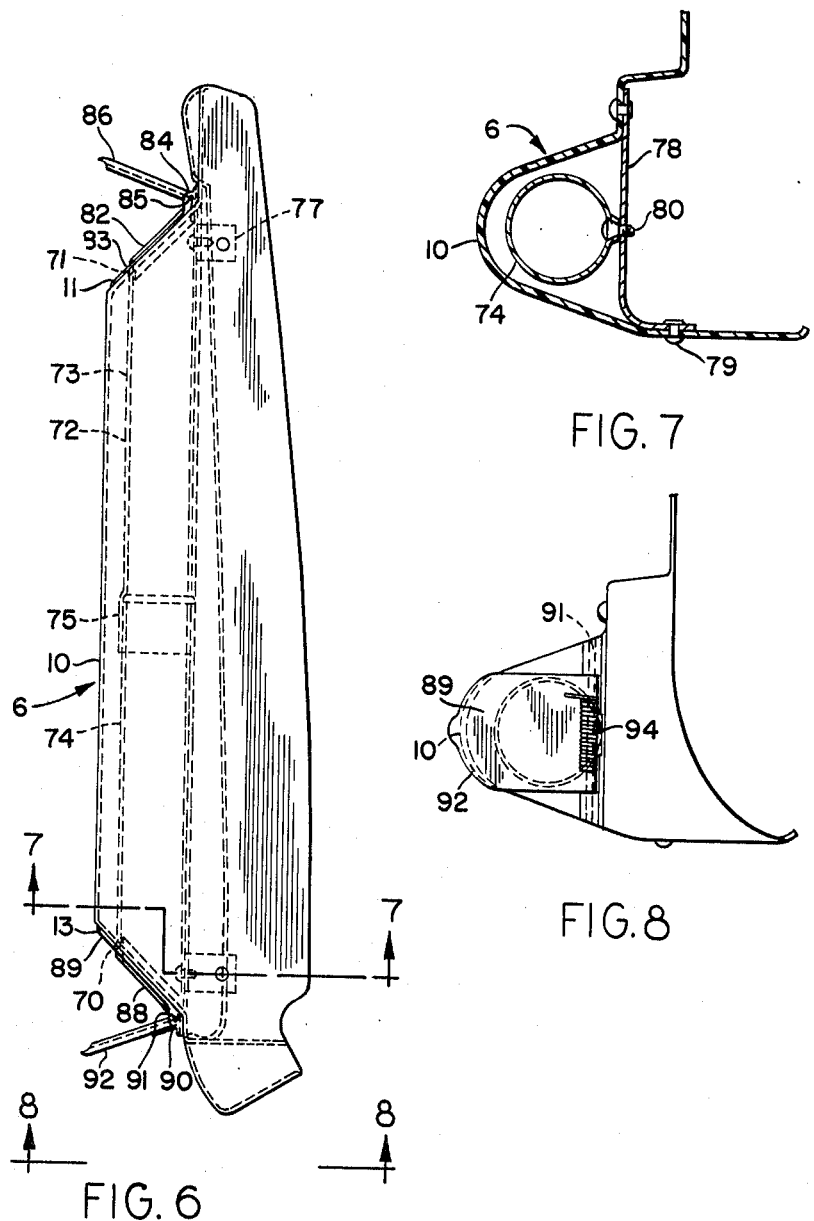
INVENTOR
GEORGE F. GIELOW
BY Oberlin, Maky & Donnelly
ATTORNEYS

United States Patent Office

3,247,953
Patented Apr. 26, 1966

3,247,953
VEHICLE SEAT ASH RECEIVER
George F. Gielow, Mansfield, Ohio, assignor to National Seating Company, Mansfield, Ohio, a corporation of Ohio
Filed Sept. 3, 1964, Ser. No. 394,360
9 Claims. (Cl. 206—19.5)

This application is a continuation-in-part of applicant's copending application, Serial No. 247,078, filed December 26, 1962, entitled "Vehicle Seat Ash Receiver," now abandoned. This invention relates generally, as indicated, to a vehicle seat ash receiver and more particularly to a container for ashes for the back of a bus or other type vehicle seat.

Vehicle ash receivers present basically two problems. The ash receiver must be of sufficient volume to accommodate collected cigarette ashes for an extended period of time such as that involved in cross-country bus runs. Ordinarily, a thorough cleaning of the bus will not occur until the completion of the run. Secondly, when the bus is cleaned, the ash receiver must be readily removable so that the ash container can be emptied. The ease of removal and replacement of the ash container, of course, facilitates the maintenance and cleaning of the vehicle.

It is accordingly a principal object of the present invention to provide a vehicular seat ash receiver of high volume.

A further principal object is the provision of such high volume vehicular seat ash receiver which can readily be removed and replaced.

A further object is the provision of a large capacity vehicular seat ash receiver having an easily manipulated lid which will close the ash receiver when not in use.

A still further object is the provision of a seat ash receiver for vehicles which can readily be emptied.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary perspective view of the rear of a bus or vehicular seat employing an ash receiver in accordance with the present invention;

FIG. 2 is an exploded view of the ash receiver shown in FIG. 1 illustrating its manner of assembly;

FIG. 3 is an enlarged fragmentary rear elevation of another form of the present invention;

FIG. 4 is a side elevation showing the ash receiver in FIG. 3;

FIG. 5 is an enlarged vertical section of the ash container of FIGS. 3 and 4 illustrating the details of the lid;

FIG. 6 is a fragmentary side elevation of a preferred form of the present invention;

FIG. 7 is a fragmentary horizontal section taken substantially on the line 7—7 of FIG. 6; and FIG. 8 is a plan view of the bottom of the invention shown in FIG. 6 as seen from the line 8—8 thereof.

Referring now to the drawings and more particularly to FIG. 1, there is illustrated the back of a bus or like vehicular seat which includes a base or frame 1 having upstanding portions 2 and 3 which pivotally support a seat back 4 for adjustable inclination with respect to the seat portion of such vehicular seat. The seat back 4 is provided with a top head rest and a back or plastic shell 6 enclosing the rear of the upstanding seat back. The plastic shell 6 which fits closely against the seat back 4 is provided with a slight horizontal top rib 7, a side rib 8, and a bottom horizontal rib 9. A much more pronounced side ridge 10 is provided opposite the rib 8 and includes an inclined top surface 11 (see FIG. 2) provided with a substantially elliptical opening 12 in the plane of the material of the shell. The bottom of the ridge 10 is also provided with an oppositely inclined bottom surface 13. The pronounced vertically extending ridge 10 in the seat back shell 6 accommodates the ash receiver of the present invention.

In the embodiment of the invention illustrated in FIGS. 1 and 2, the ash receiver comprises a tubular container 15 having a closed bottom 16 and an open top provided with an escutcheon 17 having a central ash receiving opening 18 therein. The escutcheon 17 may be bonded or otherwise secured to the open top of the container 15 and is inclined with respect to the axis of the container in the same manner as the top surface 11 is inclined with respect to the axis of the ridge 10. The escutcheon 17 is provided with a top vertically extending flange or lip 19 and two horizontally apertured projections 20 and 21 receive a hinge pin 22 which also extends through a lid 23 provided with a lifting tab 24. The projections 20 and 21 are at the juncture of the inclined top surface of the escutcheon and the upwardly vertically extending flange or lip 19.

A clip 26 having a rebent outwardly projecting top latching edge 27 is fastened to the shell 6 at the top of the elliptical opening 12 by means of suitable fasteners such as screws, rivets or the like 28. The clip 26 is thus permanently positioned on the shell back 6.

The bottom or closed end of the tubular container 15 is provided with a spring 29, the free end 30 thereof being adapted to engage the inclined bottom surface 13 of the ridge of the shell 6. The ash receiver with the escutcheon 17 secured in place can then be inserted through the slightly oversize opening 12 until the spring tip 30 engages the bottom 13 of the ridge and pressed further deforming spring 29 to snap the flange or lip 19 under the latching edge 27 of the clip 26. The ash container will then firmly resiliently be secured within the ridge 10 of the seat back and access thereto is readily provided by the lifting of the lid 23. To remove the container for emptying purposes, a slight rearward pull at the opening will disengage the lip 19 from the latching edge 27 and the container may then be pulled upwardly out of the opening 12 and emptied. When emptied, the container can then readily be replaced within the opening 12 until the spring tip 30 engages the bottom 13 and then snapped under the latching edge 27. With the lip and latching edge thus in engagement, the container will be firmly held in place.

Referring now to FIGS. 3, 4 and 5, there is illustrated another form of the present invention wherein the tubular ash container retaining means is located within the shell and not exposed as in the case of the embodiment shown in FIGS. 1 and 2. The plastic shell seat back 6 and the vertically extending ridge 10 therein may be identical in form to that shown in FIG. 1. The tubular ash container 32, while similar to the container 15, has a rounded bottom 33 provided with a central button-type plug 34 having spring latch members operative resiliently to latch the plug within an aperture in the bottom of the container. Such plug button may be, for example, a United Carr type plug button well known in the art. Such button may then readily be removed and replaced for a thorough cleaning of the container.

The top of the container 32 terminates in a plane parallel to the inclined top 11 of the ridge 10 and is provided with an escutcheon 35 having a cylindrical portion 36 which fits down inside the container and an inclined flange portion 37 which extends parallel to the top 11 of the ridge 10 and closes the oversize opening 12 in such top surface 11. The escutcheon also, of course, contributes to the support of the container 32 within the seat shell back. The cylindrical portion 36 extends slightly above the flange portion 37 to provide an elliptical lip 38 on which the lid 39 seats.

Such lid is provided with a mating bottom elliptical ridge 40 and a forwardly projecting lifting tab 41. The lid 39 is hinged to two knuckle projections 42 and 43 projecting from the escutcheon between the rear of the flange portion 37 and the vertically extending back lip 44 which in the inserted position of the ash receiver fits snugly beneath the horizontal top rib 7 of the shell back 6. The lid 39 is hinged to the knuckles by means of hinge pins 45 and 46 shown in FIG. 3. The hinge end of the lid 39 is provided with a camming surface 48 which cooperates with the distal end of a cover spring 49 which bears against such surface resiliently to hold the cover 39 either in closed or open position. The peak of the camming surface, on one side of the spring, will hold the cover closed, as shown in FIG. 5, and on the other side of the distal end of the spring, will hold the cover open. The spring is bent as shown at 50 and extends parallel to the interior of the tubular container 32 and is secured thereto by rivets or like fasteners 51.

The tube 32 is joined to the escutcheon 35 by an adhesive such as Scotchweld or the equivalent. Any of the well-known epoxy adhesives may be employed, or the escutcheon may be secured by brazing or soldering to the container. In any event, a complete cure of the adhesive is obtained before further assembly of the ash container. The joint is also finished so that no burrs or roughness is found inside or out.

Removably to secure the container 32 within the shell, there is provided an interior guide and locking assembly 52. Such assembly may be held to the interior of the ridge 10 of the shell back by suitable fasteners such as screws or rivets extending through the shell back and the apertures on each side of the guide shown at 53 in FIGS. 3 and 4. The guide assembly 52 includes a forwardly projecting portion 54 which encompasses the container and closely conforms to the interior of the ridge 10 of the shell back. A leaf spring 55 is secured to the front of the encompassing portion 54 as by the rivet 56 and such spring is sinusoidal in shape and bears against the container 32 at 57.

At the rear of the guide assembly there is a vertically extending bridge plate 60 extending across the back of the ridge and in such plate there is provided an aperture 61 accommodating a stop pin 62 secured to the back of the tubular container 32. Such stop pin is provided with a rounded nose as shown to facilitate the entry of such pin into the aperture 61 in the guide assembly. The guide assembly 52 will be installed on the shell back so that the aperture 61 is properly aligned with the stop pin 62 when the ash tray tube 32 and the escutcheon 35 thereon is snug against the shell as shown in FIG. 5.

It is now believed apparent how the ash tray is removed and replaced. The lid is simply opened and a finger is placed in the opening provided by the escutcheon. With the finger in the opening, a gentle pull toward the shell or to the left as seen in FIG. 5 will compress the spring 57 and unseat the stop pin 62 from the aperture 61. The container 32 may then be lifted upwardly until the tube is out of the shell. Such procedure is simply reversed to install the container within the shell back. The container will be inserted through the opening and a gentle pressure or pull toward the left as seen in FIG. 5 will compress the spring 57 so that the stop pin will clear the plate 60 and when the escutcheon is properly seated against the shell, the pressure may be released so that the pin 62 will properly enter the aperture 61. When the pin is properly seated, the tube will then firmly be supported within the shell both by the pin 62 and the escutcheon flange 37 resting on the top 11 of the ridge 10.

Referring now to the preferred embodiment of the invention illustrated in FIGS. 6 through 8, the shell back 6 having the vertical ridge 10 therein is provided with an elliptical opening 70 in the bottom wall 13 and a similar elliptical opening 71 is provided in the top wall in the inclined top surface 11 in the same manner as seen in FIG. 2. The ash container 72 is comprised of top and bottom sections 73 and 74 which are telescopically interfitted as indicated at 75.

The top and bottom sections of the tubular container are joined to the back 6 by means of brackets 77 and 78 which bridge the groove 10 as indicated in FIG. 7 and may be secured thereto as by the rivets 79. The sections 73 and 74 of the container are joined to the brackets by screws or like fasteners 80, access to which by means of a screwdriver is readily provided horizontally through the inclined top and bottom elliptical openings.

The top of the upper section 73 has bonded thereto an escutcheon 82 which includes a peripheral flange 83 and a mounting 84 for pin 85 to which the lid 86 is provided. The top escutcheon 82 may be bonded to the section 73 by a heat curable adhesive so that the escutcheon and cover pivoted thereto are firmly secured to the tubular section 73.

The bottom of the lower section 74 is similarly provided with an escutcheon 88 having a peripheral flange 89 and a mounting 90 for pin 91 to which the bottom lid or door 92 is pivoted. As seen in FIG. 8, a coil spring 94 surrounds the pin 91 and serves to maintain the door 92 in its closed position. In the closed position thereof, the cover will lie flush against the peripheral flange 89 and well within the extreme vertical edge of the ridge 10. In this manner, a passenger cannot inadvertently kick the bottom cover open to discharge the contents of the receiver.

The lower escutcheon may be bonded to the lower section in the same manner that the upper escutcheon is bonded to the upper section. In assembly, the escutcheons will be bonded to the respective sections and after completely cured, the respective top and bottom sections will be inserted through the elliptical openings in the ridge 10 of the shell back 6 and when the escutcheon flanges are properly seated against the sloping surfaces 11 and 13, respectively, fasteners 80 will be tightened. In this manner, a simplified ash receiver which is easy to assemble and has good top access as well as convenient bottom removal without removal of the entire container is provided.

For bus or like vehicular seats, the tubular container 15 or 32, as the case may be, may be thirteen or more inches long and have a diameter of approximately one and a quarter inches. It can thus be seen that a substantial volume of cigarette or like waste can be accommodated in the container. Moreover, the container can quickly and easily be removed from the seat to be emptied and cleaned.

Other modes of applying the principle of the invention may be employed, change being made as regards the details described, provided the features stated in any of the following claims or the equivalent of such be employed.

I, therefore, particularly point out and distinctly claim as my invention:

1. In combination, a vehicular seat having a plastic shell back, a projecting vertically extending ridge in said back, an inclined top surface on said ridge, an elliptical opening in said top surface of said ridge, a tubular ash receiving container, an escutcheon on the top of said tubular ash receiving container having a flange parallel to and seated on the inclined top surface of said ridge, fastener means operatively maintaining said tubular container within said shell, and a hinged lid on the top of said escutcheon closing said tubular container.

2. In combination, a vehicular seat having a plastic shell back, a projecting vertically extending ridge in said back, an inclined top surface on said ridge, an elliptical opening in said top surface of said ridge, a tubular ash receiving container, an escutcheon on the top of said tubular ash receiving container having a flange parallel to and seated on the inclined top surface of said ridge, fastener means operatively maintaining said tubular container within said shell, said fastener means comprising a spring and latch means disposed in the interior of said shell back, and a hinged lid on the top of said escutcheon closing said tubular container.

3. The combination set forth in claim 2 wherein said spring and latch means comprises a guide assembly secured inside the ridge of said shell back, said guide assembly including a leaf spring pressing against said tubular container, and a stop pin mounted on said tubular container resiliently maintained in a latching aperture in said guide assembly by said spring means.

4. In combination, a vehicular seat having a plastic shell back, a projecting vertically extending ridge in said back, an inclined top surface on said ridge, an elliptical opening in said top surface of said ridge, a tubular ash receiving container, an escutcheon on the top of said tubular ash receiving container having a flange parallel to and seated on the inclined top surface of said ridge, fastener means operatively maintaining said tubular container within said shell, said fastener means comprising a spring and latch means, with the latter being disposed exterior of said shell back, and a hinged lid on the top of said escutcheon closing said tubular container.

5. In combination, a vehicular seat having a plastic shell back, a projecting vertically extending ridge in said back, an inclined top surface on said ridge, an elliptical opening in said top surface of said ridge, a tubular ash receiving container, an escutcheon on the top of said tubular ash receiving container having a flange parallel to and seated on the inclined top surface of said ridge, fastener means operatively maintaining said tubular container within said shell, a hinged lid on the top of said escutcheon closing said tubular container, and leaf spring means secured inside said tubular container resiliently maintaining said lid open or closed.

6. In combination, a vehicular seat having a plastic shell back, a projecting vertically extending ridge in said back, an inclined top surface on said ridge, an elliptical opening in said top surface of said ridge, an inclined bottom surface on said ridge, an elliptical opening in said bottom surface of said ridge, a tubular ash receiving container, an escutcheon on the top of said tubular ash receiving container having a flange parallel to and seated on the inclined top surface of said ridge, an escutcheon on the bottom of said tubular ash receiving container having a flange parallel to and seated on the inclined bottom surface of said ridge, a door on said escutcheon on the bottom of said container, spring means maintaining said door in a closed position, fastener means operatively maintaining said tubular container within said shell, and a hinged lid carried by said top escutcheon for selectively opening or closing the top of said tubular container.

7. The combination of claim 6 wherein said container comprises top and bottom tubular sections telescopically interfitted when assembled and fastened within said ridge of said shell back.

8. A vehicle seat ash receiver comprising a vertically extending receptacle having an inclined top opening, a tubular ash container within said receptable having an escutcheon being seated on the inclined top of said receptacle, a guide assembly in said receptacle receiving said tubular container, a stop pin mounted on said container cooperating with said guide assembly to support and latch said tubular container within said receptacle, said guide assembly including an aperture receiving said stop pin, and spring means on said guide assembly resiliently maintaining said stop pin within said aperture.

9. The ash receiver set forth in claim 8 including a hinged cover on said escutcheon, and spring means secured within said container resiliently maintaining said cover open or closed.

References Cited by the Examiner

UNITED STATES PATENTS

| 1,707,752 | 4/1929 | Blackmore | 206—19.5 |
| 2,014,030 | 9/1935 | Punke | 131—235 |
| 2,107,845 | 2/1938 | Albert | 206—19 |
| 2,445,914 | 7/1948 | Hendricks | 220—18 |

FOREIGN PATENTS

| 769,060 | 6/1934 | France. |
| 668,938 | 12/1938 | Germany. |

LOUIS G. MANCENE, *Primary Examiner.*

THERON E. CONDON, *Examiner.*